(12) United States Patent
Lee et al.

(10) Patent No.: US 11,577,256 B2
(45) Date of Patent: Feb. 14, 2023

(54) HORIZONTAL ELECTROSTATIC PRECIPITATOR AND ELECTROSTATIC PRECIPITATION METHOD USING THE SAME

(71) Applicant: DOOSAN ENERBILITY CO., LTD., Changwon-si (KR)

(72) Inventors: Jin Woon Lee, Gimhae-si (KR); Sang Rin Lee, Changwon-si (KR); Jae Dong Hwang, Gunsan-si (KR); Sang Chul Moon, Seoul (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 270 days.

(21) Appl. No.: 16/856,286

(22) Filed: Apr. 23, 2020

(65) Prior Publication Data
US 2020/0368757 A1    Nov. 26, 2020

(30) Foreign Application Priority Data

May 22, 2019   (KR) .................. 10-2019-0060285
Jul. 12, 2019    (KR) .................. 10-2019-0079012

(51) Int. Cl.
*B03C 3/08*   (2006.01)
*B03C 3/78*   (2006.01)
(Continued)

(52) U.S. Cl.
CPC ............. *B03C 3/08* (2013.01); *B03C 3/368* (2013.01); *B03C 3/41* (2013.01); *B03C 3/47* (2013.01);
(Continued)

(58) Field of Classification Search
CPC combination set(s) only.
See application file for complete search history.

(56) References Cited

U.S. PATENT DOCUMENTS 1,481,970 A * 1/1924 Welch ...................... B03C 3/76
                                                                    96/39
2,490,979 A * 12/1949 Palmer ..................... B03C 3/74
                                                                   5/145
(Continued)

FOREIGN PATENT DOCUMENTS

JP      10-244183 A      9/1998
JP      H10244183 A      9/1998
(Continued)

*Primary Examiner* — Christopher P Jones
*Assistant Examiner* — Sonji Turner
(74) *Attorney, Agent, or Firm* — Harvest IP Law LLP

(57) ABSTRACT

Disclosed herein is an electrostatic precipitation method using an electrostatic precipitator including a collection module having a collection electrode and a discharge electrode, a housing having an internal partition wall formed therein, an inlet-side passage switching member, and an outlet-side passage switching member. The electrostatic precipitation method includes collecting dust by applying a voltage to the discharge electrode while gas flows, closing some of the flow spaces, divided by the internal partition wall using the passage switching members, and performing dust collection for one of the opened flow spaces by applying a voltage to the discharge electrode therein, and performing washing for at least one of the closed flow spaces by supplying washing water to the collection electrode therein.

12 Claims, 20 Drawing Sheets

(51) Int. Cl.
*B03C 3/41* (2006.01)
*B03C 3/47* (2006.01)
*B03C 3/36* (2006.01)
*C02F 1/28* (2006.01)
*C02F 103/18* (2006.01)

(52) U.S. Cl.
CPC .................. *B03C 3/78* (2013.01); *C02F 1/28* (2013.01); *C02F 2103/18* (2013.01); *C02F 2303/16* (2013.01)

(56) References Cited

U.S. PATENT DOCUMENTS

| | | | | | |
|---|---|---|---|---|---|
| 2,604,184 | A | * | 7/1952 | Warburton | B03C 3/78 96/25 |
| 2,668,600 | A | * | 2/1954 | Wintermute | B03C 3/51 96/33 |
| 3,891,414 | A | * | 6/1975 | Snader | B03C 3/88 96/28 |
| 3,958,960 | A | * | 5/1976 | Bakke | B03C 3/16 96/232 |
| 3,958,961 | A | * | 5/1976 | Bakke | B03C 3/36 261/118 |
| 4,074,983 | A | * | 2/1978 | Bakke | B03C 3/36 96/48 |
| 4,178,156 | A | * | 12/1979 | Tashiro | B03C 3/74 95/71 |

FOREIGN PATENT DOCUMENTS

| | | |
|---|---|---|
| JP | 11-047520 A | 2/1999 |
| JP | 2000-107637 A | 4/2000 |
| JP | 2001-232242 A | 8/2001 |
| JP | 2014-100642 A | 6/2014 |
| JP | 6246273 B1 | 12/2017 |
| JP | 2018-008221 A | 1/2018 |
| KR | 1994-0007957 B1 | 8/1994 |
| KR | 10-2010-0091734 A | 8/2010 |
| KR | 10-1949984 B1 | 4/2019 |

* cited by examiner form, a roller operatively connected to the adsorption belt to move the adsorption belt, and a scraper configured to scrape off foreign substances attached on the adsorption belt.

HORIZONTAL ELECTROSTATIC PRECIPITATOR AND ELECTROSTATIC PRECIPITATION METHOD USING THE SAME

CROSS-REFERENCE TO RELATED APPLICATION(S)

This application claims priority to Korean Patent Application No(s). 10-2019-0060285 and 10-2019-0079012, filed on May 22, 2019 and Jul. 12, 2019, respectively, the disclosures of which are incorporated herein by reference in their entirety.

BACKGROUND

Technical Field

Exemplary embodiments relate to an electrostatic precipitator and an electrostatic precipitation method that are adapted to collect dust, and more particularly, to an electrostatic precipitator that allows gas to flow horizontally to the ground, and an electrostatic precipitation method using the same.

Related Art

A variety of devices have been developed to remove particulate contaminants such as fine dust contained in a gas. Among them, an electrostatic precipitator generates a large number of electrons (ions) with corona discharge, in which case the generated electrons (ions) ionizes the surrounding gas molecules. The gas molecules ionized in the electrostatic precipitator cause particulates (fine dust, debris, etc.) contained in the gas to combine thereto so that the particulates become charged (to have electrical polarity), which causes them to attach on collection electrodes due to electrostatic force.

The electrostatic precipitator has a structure with collection electrodes, which are arranged at regular intervals and electrically grounded, and with discharge electrodes, to which a high voltage is applied, installed between the respective collection electrodes. When a high voltage is applied to each of the discharge electrodes, a corona discharge occurs between the discharge electrode and the collection electrode associated therewith. Both the collection electrode and the discharge electrode are typically made of an electrically conductive material.

Since the corona discharge occurs between the discharge electrode and the collection electrode, the distance between the discharge electrode and the collection electrode should be kept uniform. However, a so-called inter-electrode rocking effect may occur due to the vibration caused by the flow of gas depending on the size of the structure and the strength of the material. To prevent such effect, the distance between the discharge electrode and the collection electrode can be increased but doing so causes a deterioration in collection efficiency and requires that a large voltage is applied to the discharge electrode for the corona discharge. On the other hand, decreasing the distance between the discharge electrode and the collection electrode results in an improvement in collection efficiency due to a short distance of movement of charged dust. In this case, however, failure to precisely and securely support the discharge electrode and the collection electrode to maintain the distance therebetween may reduce an amount of generation of corona discharge or locally concentrate the corona discharge due to the non-uniform distance between the discharge electrode and the collection electrode, resulting in a short circuit between the electrodes.

In addition, if the collection electrode is increased in size, the supply of washing water may not reach all portions thereof, which would require an increase in pressure required to spray the washing water and a larger consumption of washing water is needed. In the case of continuous washing, undesirable electrical arcs may frequently occur, instead of the desired corona discharge, due to floating or falling water particles, and there is hence a need for a separate device that removes any mist from being re-scattered in the gas due to continuous or frequent washing. If washing is performed in an intermittent manner, the gas may not be purified enough during the washing procedure.

SUMMARY

Aspects of one or more exemplary embodiments provide an electrostatic precipitator and an electrostatic precipitation method, which are capable of continuously purifying and washing gas.

Additional aspects will be set forth in part in the description which follows and, in part, will become apparent from the description, or may be learned by practice of the exemplary embodiments.

According to an aspect of an exemplary embodiment, there is provided a horizontal electrostatic precipitator that includes a housing having an inlet duct, into which a gas is introduced, and an outlet duct from which the gas is discharged, an internal partition wall extending in a flow direction of the gas in the housing and configured to respectively divide spaces within the housing, a plurality of passage switching members in the respectively divided spaces to control the flow of the gas, a collection module in the housing and including a plurality of discharge electrodes, to which a voltage is applied, and a plurality of collection electrodes disposed between the respective discharge electrodes, the collection electrodes being grounded, and the collection module being configured to collect dust, and a washing water feeder configured to spray washing water to the collection module and to selectively spray the washing water to some of the divided spaces.

The inlet and outlet ducts may be on respective sides of the housing, and the passage switching members may be in the respective inlet and outlet ducts while being rotatable relative to the housing.

The horizontal electrostatic precipitator may further include a controller configured to control the washing water feeder to supply the washing water only to one of the divided spaces, which is closed so that inflow and outflow of air are blocked by controlling the passage switching members.

The horizontal electrostatic precipitator may further include a washing water treatment device beneath the collection module to accommodate the washing water dropping from the collection module. The washing water treatment device may include a reservoir configured to accommodate the washing water, an adsorption belt in an endless-track form, a roller operatively connected to the adsorption belt to move the adsorption belt, and a scraper configured to scrape off foreign substances attached on the adsorption belt.

The adsorption belt may have a mesh-like structure.

A portion of the adsorption belt may be submerged in the washing water and the other portion of the adsorption belt may be above the washing water.

The scraper may include a support rod installed vertically on the bottom of the reservoir and an elastic tip protruding upward from the support rod.

The scraper may include a rotary rod and a plurality of paddles protruding from an outer peripheral surface of the rotary rod, the paddles being spaced apart from each other in a circumferential direction of the rotary rod.

The washing water treatment device may include two support rollers and first and second diversion rollers disposed between the support rollers, the first diversion roller being configured to support a lower end of the adsorption belt to move upward, the second division roller being configured to support the lower end of the adsorption belt to move downward, and a blocking wall may be installed in the reservoir to separate a space, in which the scraper is located, from a remaining space.

The first diversion roller may support the adsorption belt to be positioned above an upper end of the blocking wall, and the second diversion roller may support the adsorption belt to be positioned beneath the upper end of the blocking wall.

The scraper may be installed to abut on the adsorption belt between the second diversion roller and an associated one of the support rollers.

A separation container may be installed beneath the scraper and positioned in the space separated by the blocking wall.

According to an aspect of another exemplary embodiment, there is provided a horizontal electrostatic precipitator that includes a housing having an inlet duct, into which a gas is introduced, and an outlet duct from which the gas is discharged, an internal partition wall extending in a flow direction of the gas in the housing and configured to respectively divide spaces within the housing, a plurality of passage switching members in the respectively divided spaces to control the flow of the gas, a collection module in the housing and including a plurality of discharge electrodes, to which a voltage is applied, and a plurality of collection electrodes between the respective discharge electrodes, the collection electrodes being grounded, and the collection module being configured to collect dust, a washing water feeder configured to spray washing water to the collection module, and a controller configured to control the washing water feeder to supply the washing water only to one of the divided spaces, which is closed so that inflow and outflow of air are blocked by controlling the passage switching members.

According to an aspect of a further exemplary embodiment, there is provided an electrostatic precipitation method that includes collecting foreign substances by applying a voltage to a discharge electrode while a gas flows in the electrostatic precipitator, closing some of the flow spaces using passage switching members, and performing foreign substance collection on an open one of the flow spaces by applying a voltage to the discharge electrode therein, and performing washing on a closed one of the flow spaces by supplying washing water to a collection electrode therein.

In the closing some of flow spaces, only one flow space is closed, and remaining flow spaces are then sequentially closed. Or, only one flow space is closed, and a flow space that is not adjacent to the flow space, in which the washing is completed, is then closed. Or, a plurality of the flow spaces are simultaneously closed in such a manner that an open flow space is interposed between the closed flow spaces.

In the entirely collecting dust, the flow space in which the washing is completed may be opened, and the dust collection may be performed on the open flow space into which the gas flows.

Inlet and outlet ducts may be formed on sides of a housing, the passage switching members may be installed in the respective inlet and outlet ducts, and in the entirely collecting dust, and the gas may flow horizontally to the ground.

In the closing some of flow spaces, a plurality of flow spaces may be simultaneously closed in such a manner that an open flow space is interposed between the closed flow spaces.

The performing foreign substance collection may include spraying the washing water to a collection module and collecting the washing water sprayed for washing into a reservoir disposed beneath the collection module.

The electrostatic precipitation method may further include opening the outlet-side passage switching member to discharge moisture and then opening the inlet-side passage switching member to introduce the gas into a particular flow space.

The electrostatic precipitation method may further include removing foreign substances from the washing water dropping from the collection module, and in the removing foreign substances, the foreign substances may be filtered out and removed from the washing water accommodated in a reservoir by attaching the foreign substances on an endless-track-shaped filter belt during movement of the filter belt.

It is to be understood that both the foregoing general description and the following detailed description of exemplary embodiments are exemplary and explanatory and are intended to provide further explanation of the disclosure as claimed.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
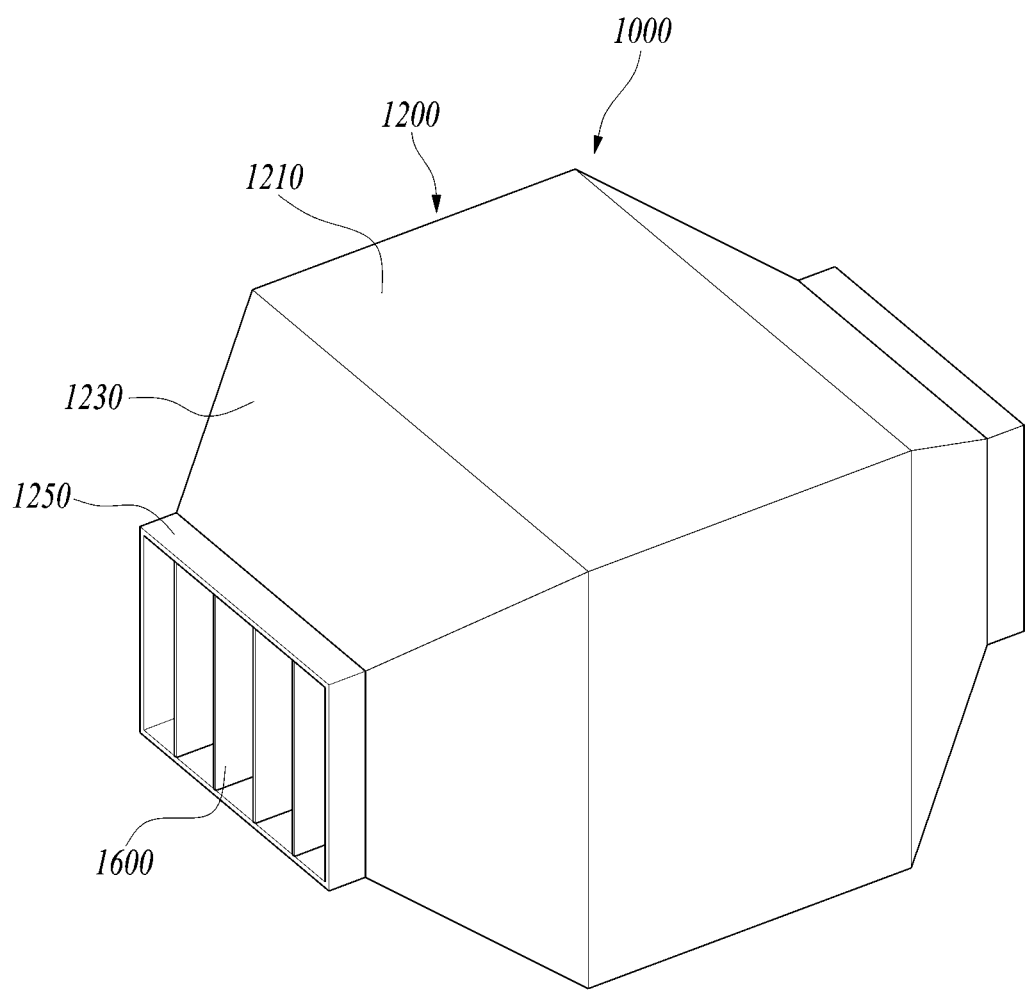
FIG. 1 is a perspective view illustrating an electrostatic precipitator according to a first exemplary embodiment.

Various modifications and various embodiments will be described below in detail with reference to the accompanying drawings so that those skilled in the art can easily carry out the invention in this disclosure. It should be understood, however, that the various embodiments are not for limiting the scope of the disclosure to the specific embodiment, but they should be interpreted to include all modifications, equivalents, and alternatives of the embodiments included within the concepts and scope disclosed herein.

The terminology used herein is for the purpose of describing specific embodiments only and is not intended to limit the scope of the disclosure. The singular expressions "a", "an", and "the" are intended to include the plural expressions as well unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Exemplary embodiments will be described below in detail with reference to the accompanying drawings. Throughout the disclosure, like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

Figure 2:
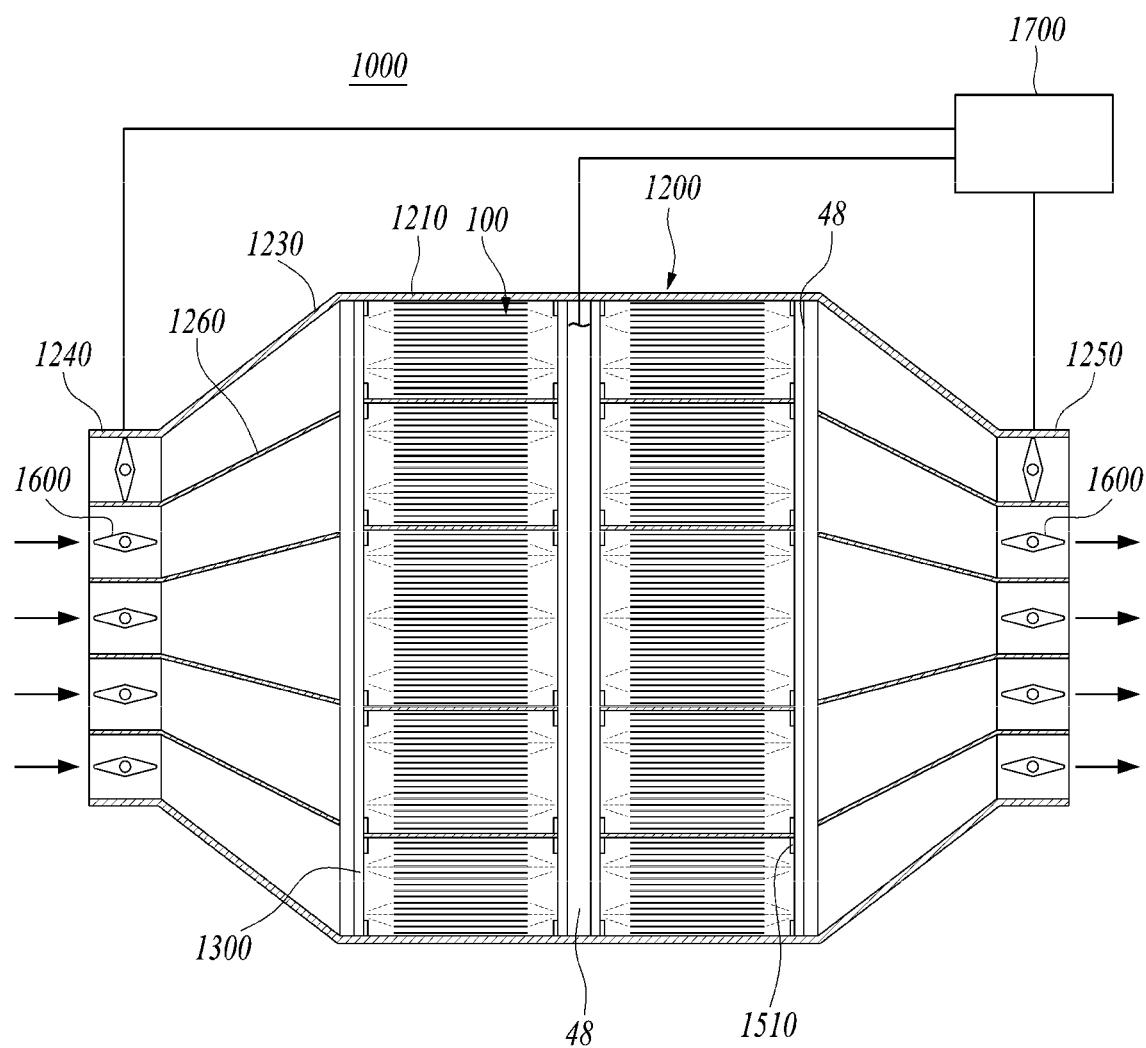
FIG. 2 is a cross-sectional view illustrating the electrostatic precipitator according to the first exemplary embodiment.

Hereinafter, an electrostatic precipitator according to a first exemplary embodiment will be described. FIG. 1 is a perspective view illustrating the electrostatic precipitator according to the first exemplary embodiment. FIG. 2 is a cross-sectional view illustrating the electrostatic precipitator according to the first exemplary embodiment.

Referring to FIGS. 1 and 2, the electrostatic precipitator, which is designated by reference numeral 1000, according to the first exemplary embodiment is an apparatus that removes dust and droplets from air, combustion gas, or the like. The electrostatic precipitator 1000 may include a housing 1200, collection modules 100, washing water feeders 1300, an internal partition wall 1260, and passage switching members 1600.

The housing 1200 can be a box-like structure having an internal space. The housing 1200 includes an installation section 1210 into which the collection modules 100 are positioned, includes flow guides 1230, which are coupled to both ends of the installation section 1210 and each having a cross-sectional area that decreases or becomes reduced toward the outside, and includes an inlet duct 1240 coupled to one of the flow guides 1230 as well as an outlet duct 1250 coupled to the other of the flow guides 1230. The inlet and outlet ducts 1240 and 1250 may be formed on the sides of the housing 1200 so that passages for the flow of gas are defined in a horizontal direction with respect to the ground. The housing 1200 may have a reservoir at the bottom thereof to store washing water.

The internal partition wall 1260 extends from the inlet duct 1240 to the outlet duct 1250 and divides the internal space of the housing 1200 into a plurality of flow spaces FS. The internal partition wall 1260 in the housing 1200 may be one or a plurality of internal partition walls extending in the flow direction of gas.

The passage switching members 1600 are installed in the respective flow spaces FS, divided by the internal partition wall 1260, in the respective inlet and outlet ducts 1240 and 1250. Each of the passage switching members 1600 is rotatably installed in the housing 1200. The passage switching member 1600 extends in the height direction of the housing 1200 and gradually increases in thickness from each opposing side ends to the widthwise center thereof.

When the passage switching member 1600 is disposed in parallel to the flow direction of gas, the flow of gas may be uniform. On the other hand, when the passage switching member 1600 is disposed perpendicular to the flow direction of gas, the flow of gas may be blocked.

The plurality of collection modules 100 are installed in the installation section 1210 and spaced apart from each other with support columns 1510 interposed therebetween. The collection modules 100 may be arranged vertically, laterally, or longitudinally in the housing 1200. The collection modules 100 may each be modularized by tie rods and frames and installed in the housing 1200.

The plurality of support columns 1510 may be installed in the installation section 1210 of the housing 1200 and each can have a square shape (cross-section) that extends in the height direction of the housing 1200. A plurality of supporting brackets 1530 may be fixed to each of the support columns 1510 to support the collection modules 100. In addition, a tubular girder 48 may be installed on the support column 1510 and supported by abutting on the upper end of the support column 1510. The tubular girder 48 extends in the stacking direction of the collection modules 100 and supports insulating connection members 40 which will be described below.

The washing water feeders 1300 are spaced apart from each other on each opposing side ends of each collection module 100 to spray washing water in a lateral direction (in a direction parallel to the ground). The washing water feeders 1300 may each include a washing water pipe and a nozzle and may be arranged on both widthwise ends of the installation section 1210 and at the widthwise center of the installation section 1210.

The washing water feeders 1300 spray washing water to the collection modules 100 to remove the dust attached on the collection electrodes 13. The washing water feeders 1300 operate only when no voltage is applied to the collection modules 100. The washing water feeders 1300 are installed to independently operate in the flow spaces FS divided by the internal partition wall 1260. That is, the individual washing water feeders 1300 may supply washing water only to one of the flow spaces FS.

The electrostatic precipitator 1000 according to the present exemplary embodiment may further include a controller 1700 that may control the rotation of the passage switching members 1600 and the operation of the washing water feeders 1300. The controller 1700 may control the passage switching members 1600 to prevent the inflow and outflow of gas into and from an associated one of the flow spaces FS, and may control the washing water feeders 1300 to supply washing water only to the closed flow space FS. That is, the controller 1700 may control the inlet-side passage switching member 1600 and outlet-side passage switching member 1600 installed in each of the flow spaces FS to rotate perpendicularly to the flow direction of gas, and may control the washing water feeders 1300 to supply washing water only to the flow space closed by the passage switching members 1600. When the washing water is supplied for a particular time period, the controller 1700 may stop the supply of the washing water to the associated flow space FS, rotate and open the passage switching members 1600 again so that the gas flows, and then cause washing to be performed on another flow space FS.

A plurality of sensors 1900 may be installed in the housing 1200 to measure information about whether dust is attached on the collection electrodes 13. The controller 1700 may determine a particular flow space FS, on which dust collection will be performed, based on the information received from the sensors 1900. The sensors 1900 may be of various types such as ultrasonic sensors, image sensors, and/or optical sensors.

In addition, a washing cycle and a washing time may be input to the controller 1700 in advance, and the controller 1700 may cause washing to be performed at a certain cycle for a certain time. The washing cycle may be 1 to 48 hours and the washing time may be 30 to 300 seconds.

Furthermore, the controller 1700 may first cause washing to be performed on the outermost (first) flow space FS, cause a (second) flow space FS adjacent thereto to be skipped, cause washing to be performed on a third flow space FS and a fifth flow space FS, and then cause washing to be performed on a second flow space FS and a fourth flow space FS. That is, the controller 1700 may be set to wash a particular flow space FS that is not adjacent to the washed flow space FS.

As described above, according to the first exemplary embodiment, since the internal partition walls 1260 and the passage switching members 1600 are installed, it is possible to wash some of the flow spaces FS while continuously performing dust collection on the others, as well as performing continuous washing. In addition, since the flow space FS on which the washing is performed is sealed, it is possible to prevent the mist, caused by the washing, from being discharged to the outside.

Figure 3:
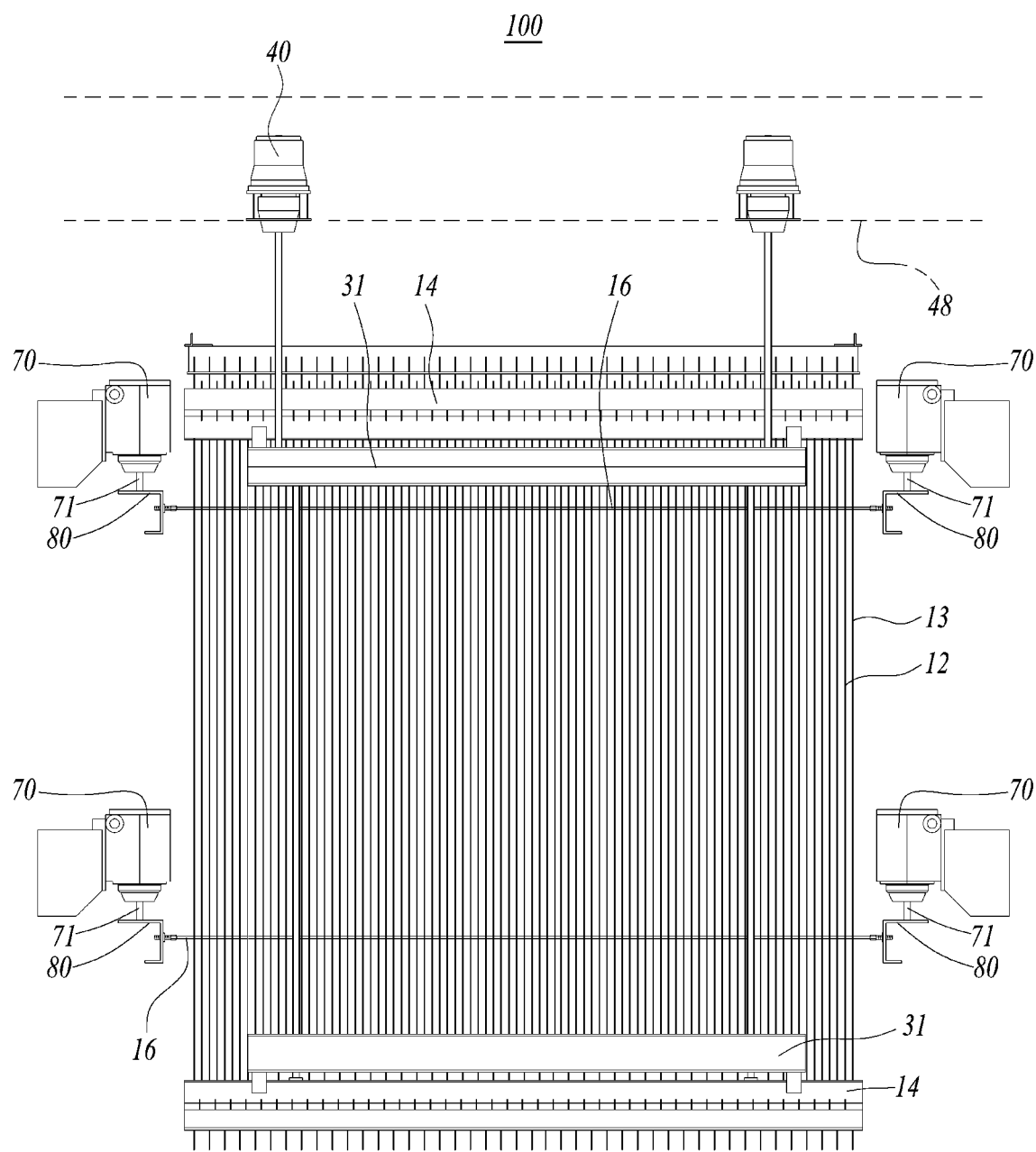
FIG. 3 is a side view illustrating one collection module according to the first exemplary embodiment.
Figure 4:
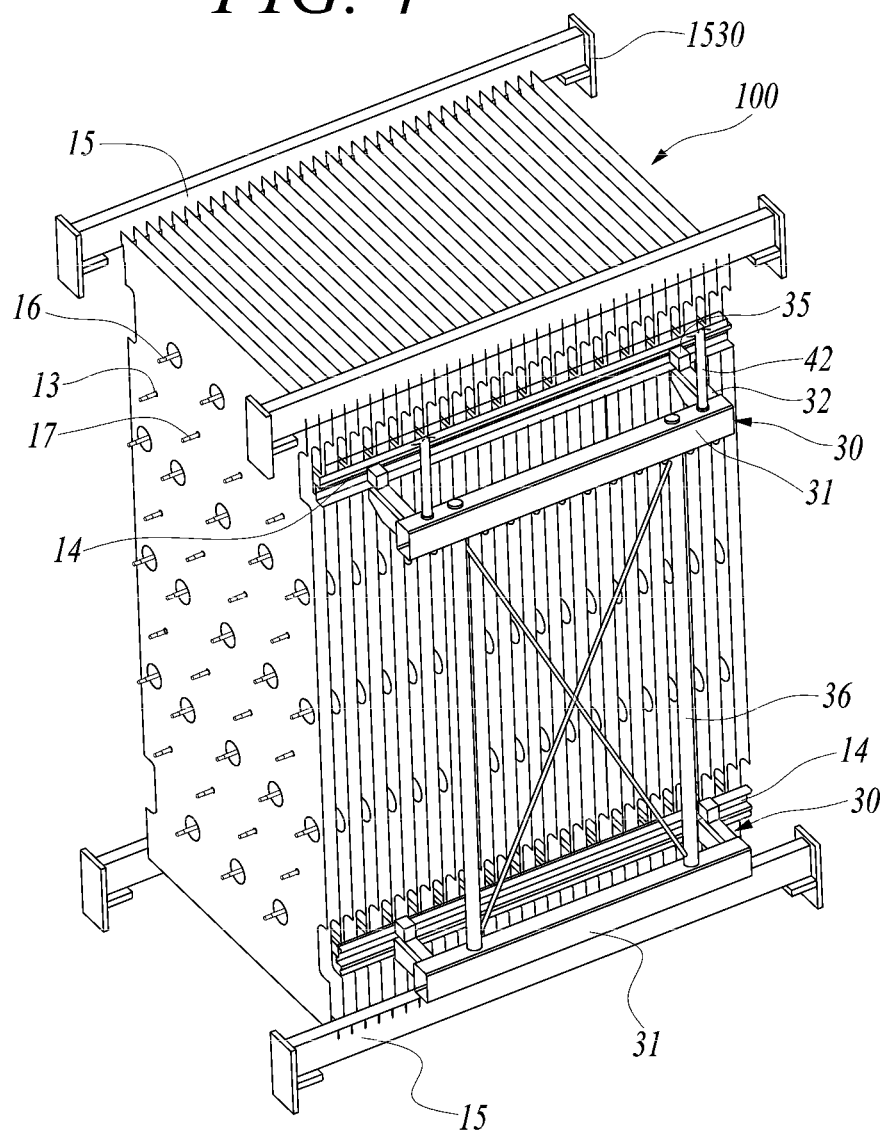
FIG. 4 is a perspective view illustrating the collection module according to the first exemplary embodiment.
Figure 5:
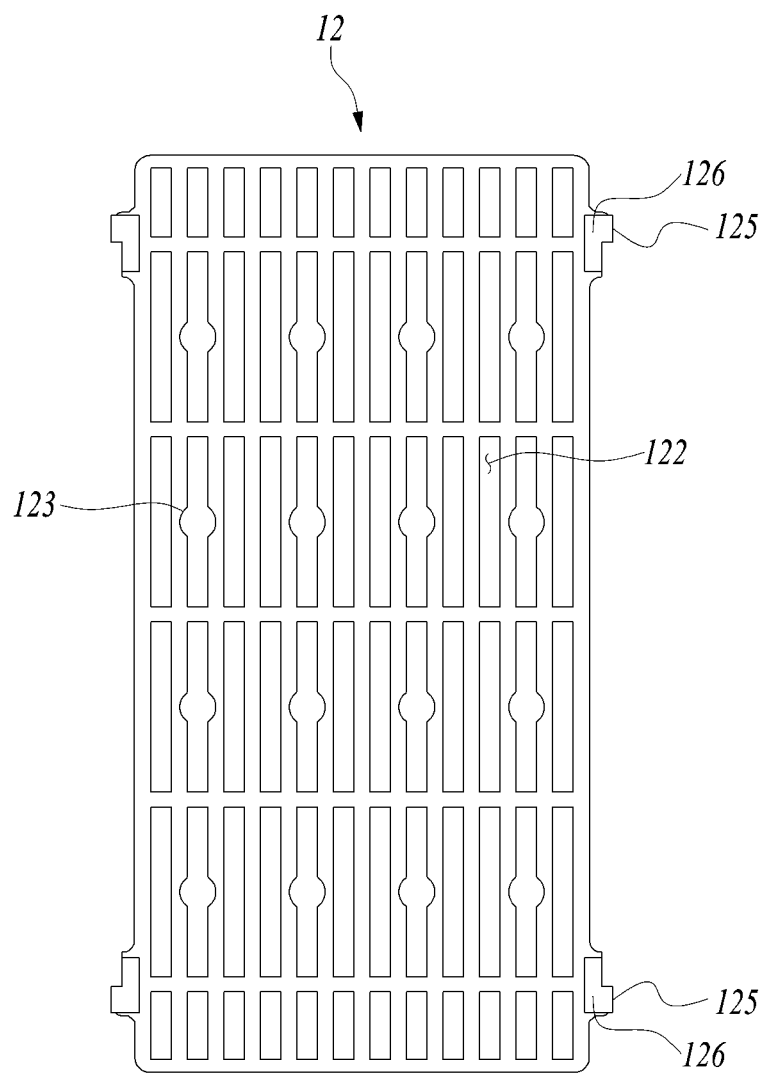
FIG. 5 is a front view illustrating one discharge electrode according to the first exemplary embodiment.
Figure 6:
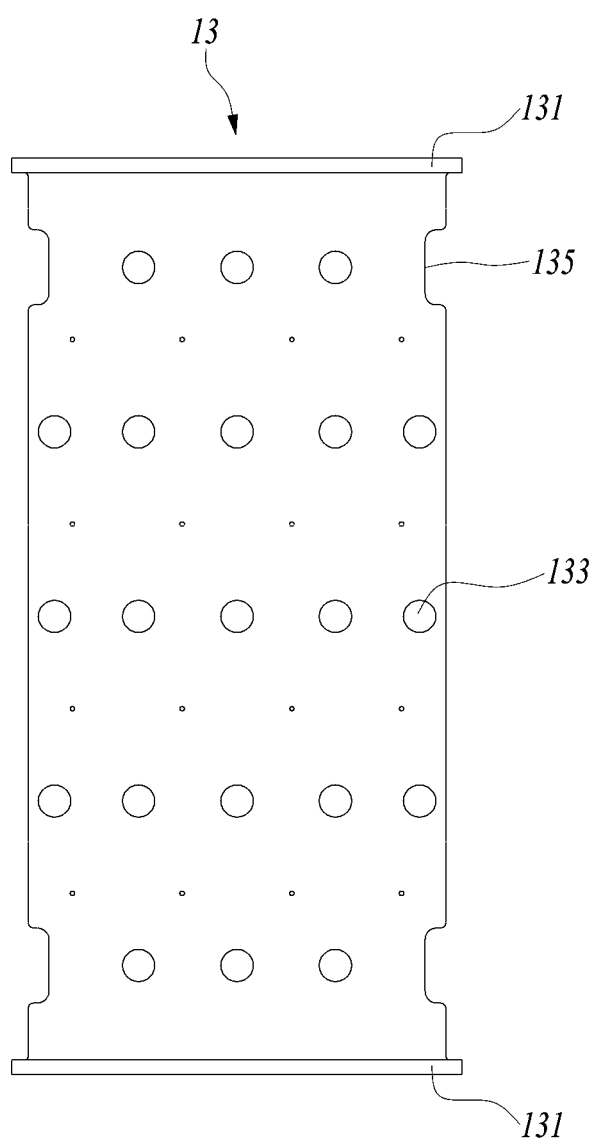
FIG. 6 is a front view illustrating one collection electrode according to the first exemplary embodiment.

FIG. 3 is a side view illustrating one collection module according to the first exemplary embodiment. FIG. 4 is a perspective view illustrating the collection module according to the first exemplary embodiment. FIG. 5 is a front view illustrating one discharge electrode according to the first exemplary embodiment. FIG. 6 is a front view illustrating one collection electrode according to the first exemplary embodiment.

Referring to FIGS. 3 to 6, the collection module 100 includes discharge electrodes 12, collection electrodes 13, first tie rods 16, second tie rods 17, first setting beams 14, second setting beams 15, insulating connection members 40, prestress locking members 70, lower frames 30, and a tubular girder 48.

Each of the discharge electrodes 12 has a flat plate shape and has a plurality of openings 122. The openings 122 may each have a square shape, but the present disclosure is not limited thereto. The discharge electrode 12 may be formed with a plurality of discharge pins 12a having various serrated shapes. The discharge pins 12a may be spaced apart from each other along the outer end and openings of the discharge electrode 12. The discharge electrode 12 may be formed of a rectangular plate whose height is larger than its width.

The discharge electrode 12 includes a plurality of reinforcement protrusions 125 protruding from the side ends thereof, and the reinforcement protrusions 125 are formed on each opposing side ends of the upper and lower portions of the discharge electrode, respectively. Reinforcement plates 126 may be attached to the respective reinforcement protrusions 125 and may each be formed of a substantially L-shaped plate. The reinforcement plates 126 are coupled to the first setting beams 14 to support the discharge electrode 12. The discharge electrode 12 may have a plurality of first holes 123 through which the first tie rods 16 pass.

Each of the collection electrodes 13 is formed of a flat plate and has a plurality of second holes 133 through which the second tie rods 17 pass. The collection electrode 13 may be formed of a rectangular plate whose height is larger than its width.

The collection electrode 13 includes reinforcement rods 131 disposed at the upper and lower ends thereof to support the collection electrode 13. The reinforcement rods 131 may extend in the width direction of the collection electrode 13 and may be longer than the width of the collection electrode 13 to protrude from each opposing side ends of the collection electrode 13.

The plurality of discharge electrodes 12 and collection electrodes 13 are arranged in parallel to each other, and the discharge electrodes 12 are equally disposed between the respective collection electrodes 13. A gap G1 between each of the collection electrodes 13 and the discharge electrode 12 adjacent thereto may be 20 to 40 mm.

The collection electrode 13 has avoidance grooves 135 formed on each opposing side ends of the upper and lower portions thereof, and the first setting beams 14 are installed to pass through portions where the avoidance grooves 135 are formed. The upper end of each of the avoidance grooves 135 may be formed above the associated reinforcement plate of the discharge electrode to prevent the short circuit of the collection electrode 13 to the discharge electrode 12.

When a high voltage is applied to the discharge electrode 12, a corona discharge occurs between the discharge electrode 12 and the collection electrode 13 to generate an electrostatic force. Particulates are charged by combining with ions (electrons) generated with the corona discharge while gas and droplets move to the region where the electrostatic force is generated with the corona discharge, and then attached on the collection electrode 13 by the electrostatic force. Thus, the dust and fine droplets are attached on the collection electrode 13 and removed from the exhaust gas.

Each of the first tie rods 16 is fitted to the plurality of collection electrodes 13 through the associated first holes 123 formed in the discharge electrodes 12, in which case the first tie rod 16 does not come into contact with the discharge electrodes 12.

Figure 7:
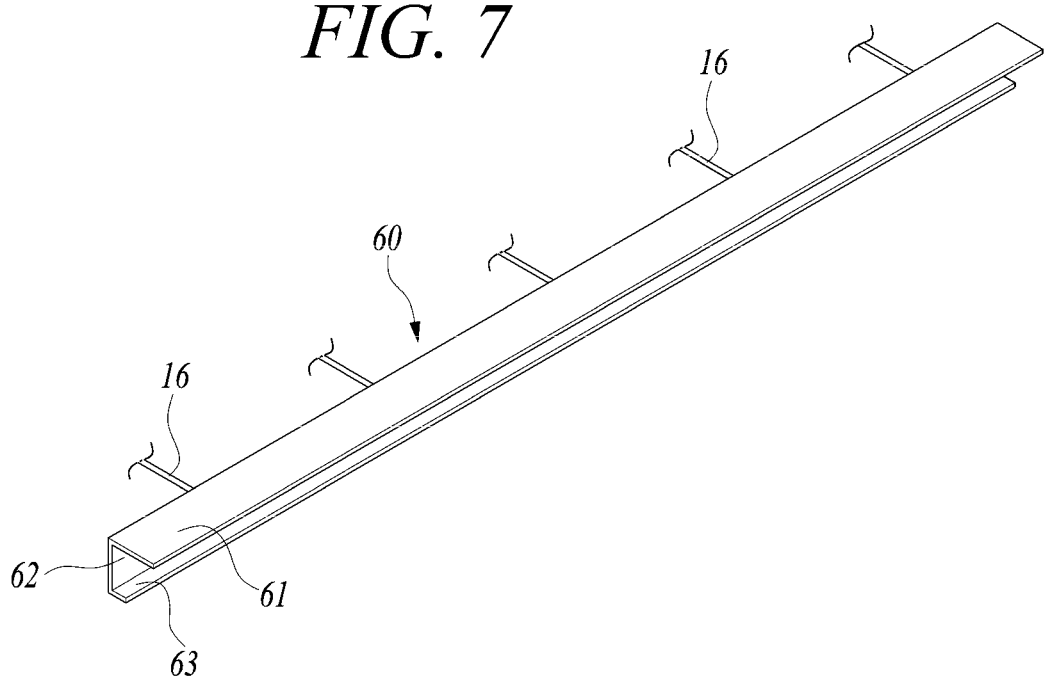
FIG. 7 is a perspective view illustrating one discharge electrode support beam according to the first exemplary embodiment.

The first tie rod 16 may have threads formed on the longitudinal ends thereof, and the ends of the first tie rod 16 may be fixed to collection-electrode-side support beams 60. As illustrated in FIG. 7, the collection-electrode-side support beams 60 are disposed at the respective outermost sides of the stacked discharge electrodes 12 and extend in the width direction of the discharge electrodes 12. Each of the collection-electrode-side support beams 60 includes an upper support plate 61, a side support plate 62 bent downward from the upper support plate 61, and a lower support plate 63 bent from the side support plate 62 to be parallel to the upper support plate 61. The first tie rod 16 is coupled to the side support plate 62, and the lower support plate 63 has a smaller width than the upper support plate 61. The collection-electrode-side support beams 60 may be fixed to the inner walls of the housing 1200 or to the support columns 1510 through insulating devices.

Meanwhile, each of the second tie rods 17 is fitted to the plurality of discharge electrodes 12 through the associated second holes 133 formed in the collection electrodes 13, in which case the second tie rod 17 does not come into contact with the collection electrodes 13. The second tie rod 17 may have longitudinal ends fixed to discharge-electrode-side support beams 80.

The first and second tie rods 16 and 17 may have spacers installed to maintain the distance between the discharge electrode 12 and the collection electrode 13. That is, the spacer installed on the second tie rod 17 may pass through an associated second hole 133 of each collection electrode 13 so that both longitudinal ends of the spacer abut on the facing surfaces of the discharge electrodes 12 adjacent to the collection electrode 13. In addition, the spacer installed on the first tie rod 16 may pass through an associated first hole 123 of each discharge electrode 12 so that both longitudinal ends of the spacer abut on the facing surfaces of the collection electrodes 13 adjacent to the discharge electrode 12. The first and second tie rods 16 and 17 are each made of a nonconductor material.

Figure 8:
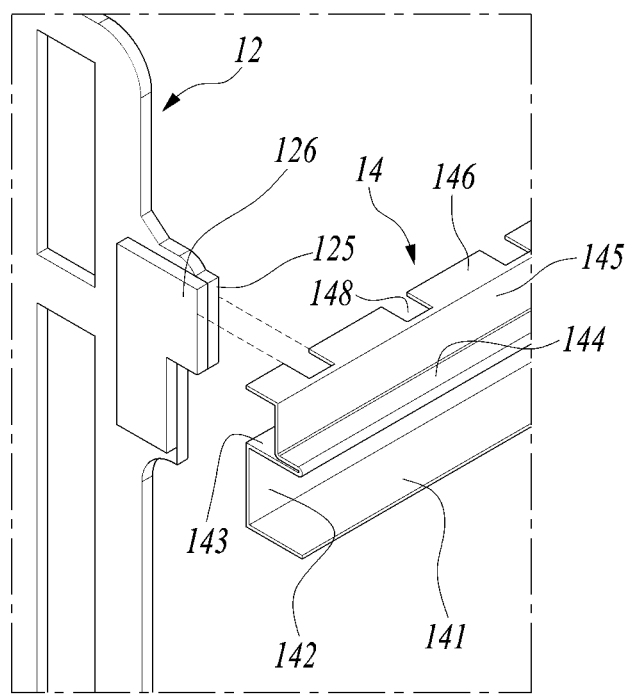
FIG. 8 is an exploded perspective view partially illustrating one first setting beam and one discharge electrode according to the first exemplary embodiment.
Figure 9:
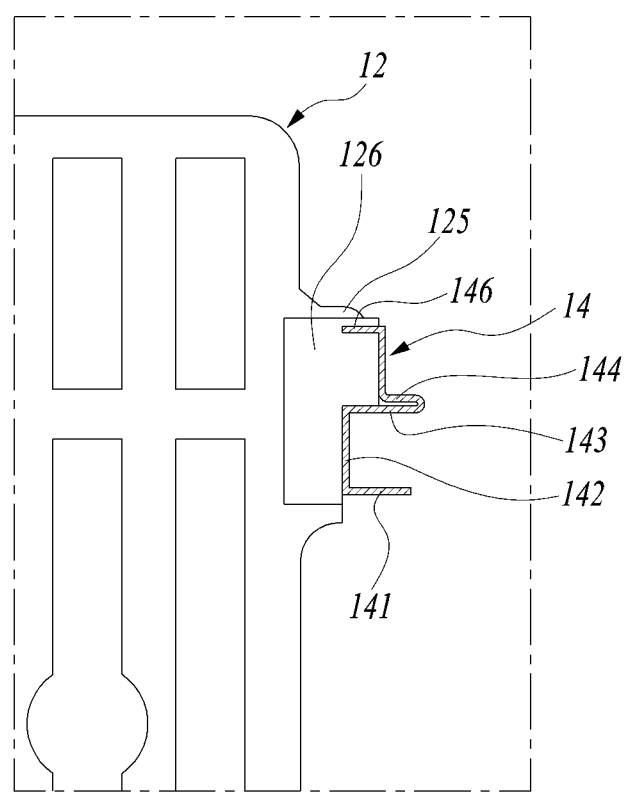
FIG. 9 is a cutaway cross-sectional view illustrating a state in which the first setting beam and the discharge electrode are coupled to each other according to the first exemplary embodiment.

FIG. 8 is an exploded perspective view partially illustrating one first setting beam and one discharge electrode according to the first exemplary embodiment. FIG. 9 is a cutaway cross-sectional view illustrating a state in which the first setting beam and the discharge electrode are coupled to each other according to the first exemplary embodiment.

Referring to FIGS. 8 and 9, each of the first setting beams 14 extends in the stacking direction of the discharge electrodes 12, and has a plurality of slots 148 into which the side ends of the respective discharge electrodes 12 are inserted. The reinforcement protrusions 125 and the reinforcement plates 126 are inserted into the first setting beam 14. The reinforcement plates 126 are installed to pass through the first setting beam 14, and the lower ends of the reinforcement plates 126 are supported by the first setting beam 14.

The first setting beam 14 includes a bottom plate 141 formed in parallel to the ground, a lower sidewall 142 extending upward from the bottom plate 141, an intermediate support 143 extending laterally from the lower sidewall 142, a bent plate 144 bent from the intermediate support 143 to face the intermediate support 143, an upper sidewall 145 extending upward from the bent plate 144, and an upper support jaw 146 bent toward the discharge electrodes 12 from the upper sidewall 145. The slots 148 are formed in the upper support jaw 146, and the lower ends of the reinforcement plates 126 are mounted on the intermediate support 143. The bent plate 144 has a smaller width than the intermediate support 143, and the intermediate support 143 has a portion facing the bent plate 144 and a portion facing the upper support jaw 146.

The upper sidewall 145 is formed in parallel to the lower sidewall 142 and disposed at a distance from the lower sidewall 142. Meanwhile, one portion of the side end of each reinforcement protrusion 125 further protrudes from the other portion thereof, and the upper and lower sidewalls 145 and 142 may be coupled to abut on the respective portions of the side end of the reinforcement protrusion 125.

Each reinforcement plate 126 may be made of the same material as the first setting beam 14 and may be thicker than the discharge electrode 12. Thus, the reinforcement plate 126 may be easily welded to the first setting beam 14. The discharge electrode 12 should have a small thickness and an excellent electrical conductivity, in which case it may be difficult to weld the discharge electrode if the discharge electrode 12 is high in conductivity and thin in thickness. However, according to the first exemplary embodiment, the reinforcement plate installed on the discharge electrode 12 enables the discharge electrode 12 to be easily welded to the first setting beam 14.

Figure 10:
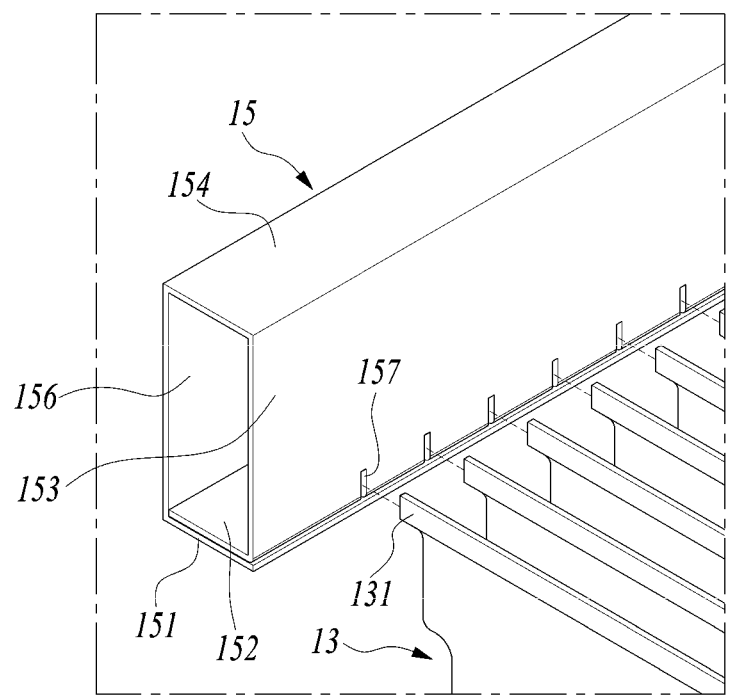
FIG. 10 is an exploded perspective view partially illustrating one second setting beam and collection electrodes according to the first exemplary embodiment.

FIG. 10 is an exploded perspective view partially illustrating one second setting beam and the collection electrodes according to the first exemplary embodiment.

Referring to FIG. 10, each of the second setting beams 15 extends in the stacking direction of the collection electrodes 13, and has a plurality of slots 157 into which the side ends of the respective collection electrodes 13 are inserted. The slots 157 are spaced apart from each other in the longitudinal direction of the second setting beam 15.

The reinforcement rods 131 are fixed to the respective upper and lower ends of each collection electrode 13, and the reinforcement rods 131 are inserted into the second setting beam 15. The reinforcement rods 131 are installed to pass through the second setting beam 15, and the lower ends of the reinforcement rods 131 are supported by the second setting beam 15.

The second setting beam 15 includes a lower plate 152, a first side plate 153 bent and extending upward from the lower plate 152, an upper plate 154 bent from the first side plate 153 to face the lower plate 152, a second side plate 156 bent from the upper plate 154 to face the first side plate 153, and a bottom support 151 bent from the second side plate 156 to be disposed beneath the lower plate 152. Each of the reinforcement rods 131 is inserted into the lower plate 152 and the first side plate 153, and the lower end of the reinforcement rod 131 is abutted and mounted on the upper surface of the bottom support 151. The reinforcement rod 131 may be fixed to the second setting beam 15 by welding. As illustrated in FIG. 4, the second setting beam 15 may be mounted to the support columns 1510 through the supporting brackets 1530. The supporting brackets 1530 may be fixed to the support columns 1510 and each be made of a nonconductor material.

As described above, in the collection module 100 according to the first exemplary embodiment, the first and second tie rods 16 and 17 and the first and second setting beams 14 and 15 may stably fix the discharge and collection electrodes 12 and 13 while maintaining the distance therebetween.

Figure 11:
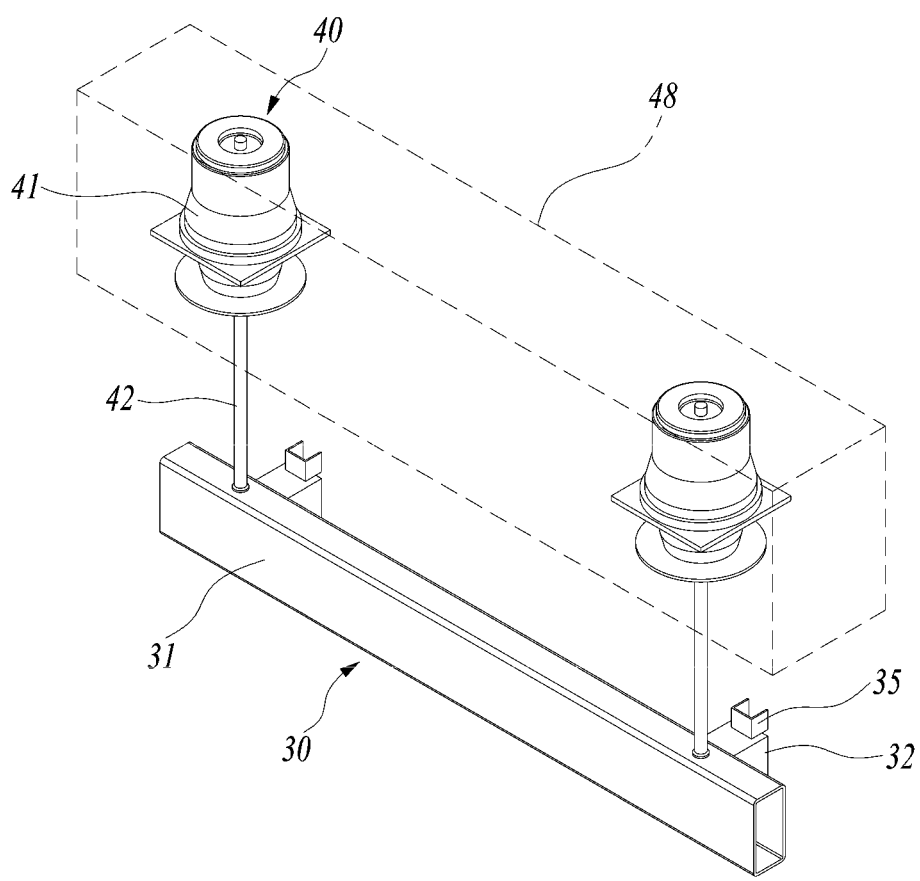
FIG. 11 is a perspective view illustrating insulating connection members and a tubular girder according to the first exemplary embodiment.
Figure 12:
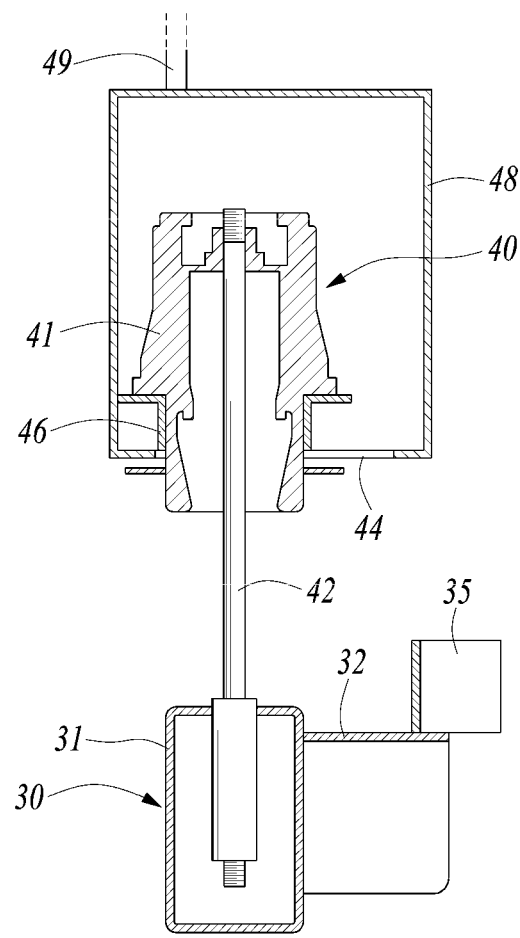
FIG. 12 is a cross-sectional view illustrating one insulating connection member and one lower frame according to the first exemplary embodiment.

FIG. 11 is a perspective view illustrating the insulating connection members and the tubular girder according to the first exemplary embodiment. FIG. 12 is a cross-sectional view illustrating one insulating connection member and one lower frame according to the first exemplary embodiment.

Referring to FIGS. 8, 11, and 12, each of the lower frames 30 extends in the stacking direction of the discharge and collection electrodes 12 and 13. Any one of the lower frames 30 is supported by the insulating connection members 40. Two lower frames 30 may be installed to one collection module 10 and fixed to each other by two connection rods 36.

Each of the lower frames 30 includes a lower pipe 31 having a substantially tubular shape, a plurality of protruding frames 32 protruding laterally from the lower pipe 31, and mounting frames 35 protruding laterally and upward from the respective protruding frames 32. The lower pipe 31 may be a pipe having a square cross-section. The protruding frames 32 may be fixed to the side of the lower pipe and each include a top plate and two side plates bent downward from the top plate. The mounting frames 35 are coupled to an associated one of the first setting beams 14 to support the first setting beam 14. The mounting frames 35 are inserted between the bottom plate 141 and the intermediate support 143 and coupled to the first setting beam 14. The mounting frames 35 of the lower frame 30 may be two in number. During operation, the lower frame 30 is charged to a high voltage, and the first setting beam 14 and the discharge electrode 12 are also charged to a high voltage through the lower frame 30. Here, the charging voltage of the discharge electrode 12 may be 15,000 to 25,000 V.

The uppermost one of the lower frames 30 is provided with the insulating connection members 40 and charged to a high voltage. The lower frame 30 disposed beneath the uppermost lower frame 30 may be charged through the connection rods 36. Each of the insulating connection members 40 includes a terminal rod 42 configured to transfer a high voltage to the discharge electrode 12, and a lower insulator 41 for insulation. The insulating connection member 40 may have a hole formed in the lower portion thereof for downward injection of air, and the terminal rod 42 is fixed to the lower frame 30 by protruding downward through the hole. An anchor can be installed to the terminal rod 42 to support the lower frame 30.

Thus, a high voltage is applied to the discharge electrode 12 through the lower frame 30 and the first setting beam 14. In addition, the lower frame 30 is suspended from the insulating connection member 40.

The insulating connection members 40 are inserted into the tubular girder 48 having an internal space, and the tubular girder 48 extends in the same direction as the lower frame 30. The tubular girder 48 may be fixed to the upper ends of the support columns 1510, and a purge air supply pipe 49 may be installed on the tubular girder 48. The tubular girder 48 may have a discharge hole 44 formed in the lower portion thereof for discharge of purge air.

The tubular girder 48 has a mount 46 installed therein to support the lower insulator 41, and the lower insulator 41 is placed on the mount 46. A power supply is connected to the insulating connection member 40 to apply a high voltage thereto, and the terminal rod 42 is insulated and fixed to the tubular girder 48 through the lower insulator 41. The terminal rod 42 may pass through the center of the lower insulator 41, and a power supply line may be connected to the upper end of the terminal rod 42. Thus, the terminal rod 42 may be charged to a high voltage and the tubular girder 48 may be grounded.

Figure 13:
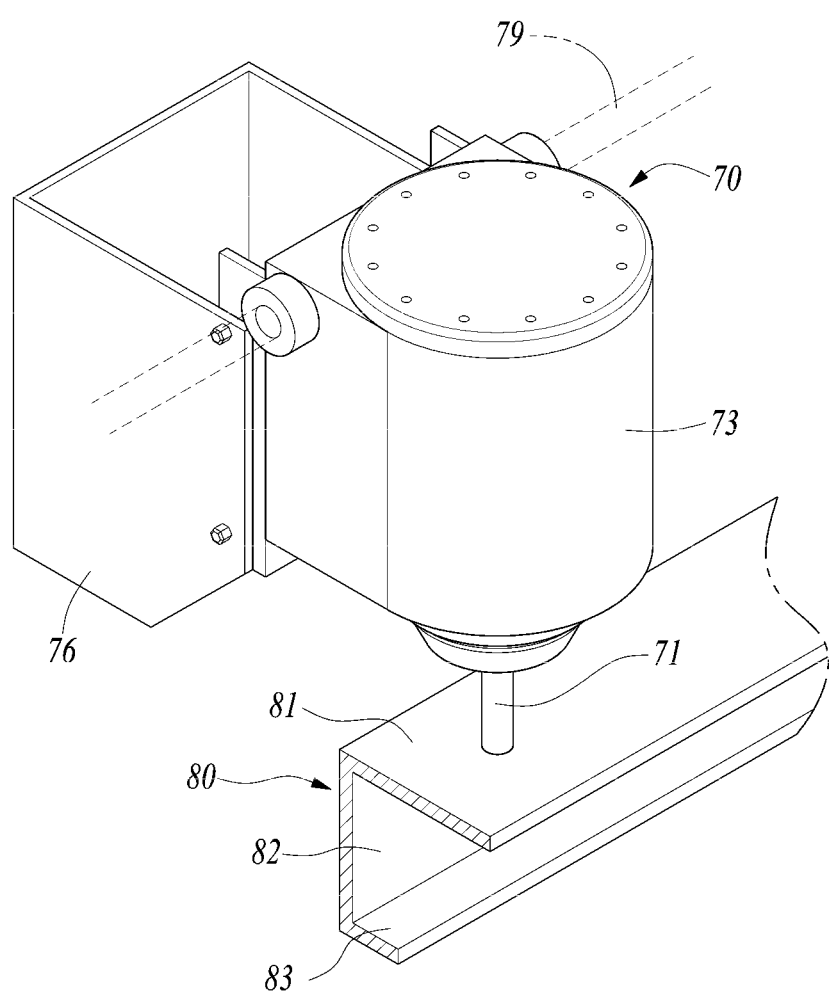
FIG. 13 is a perspective view illustrating one prestress locking member according to the first exemplary embodiment.
Figure 14:
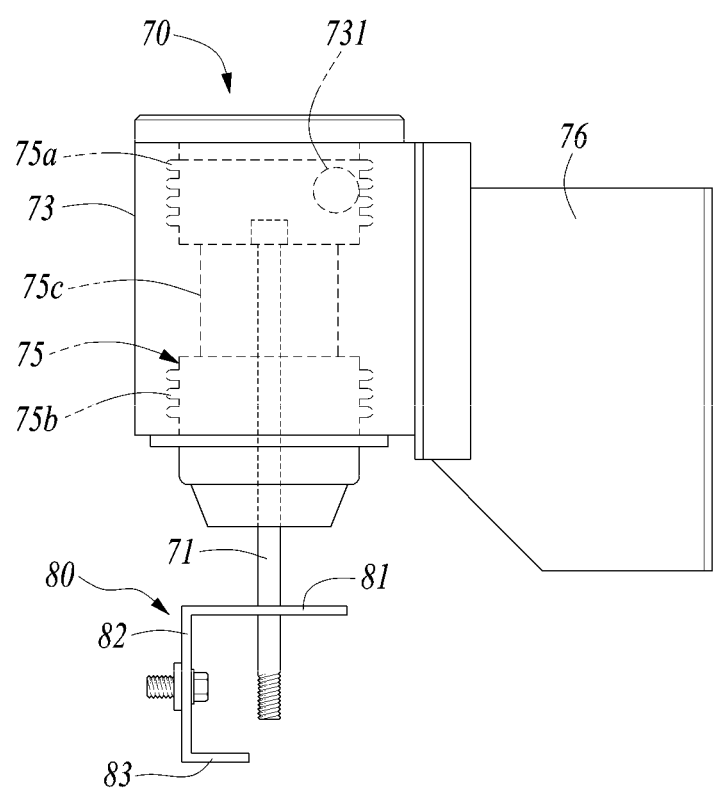
FIG. 14 is a side view illustrating the prestress locking member according to the first exemplary embodiment.

FIG. 13 is a perspective view illustrating one prestress locking member according to the first exemplary embodiment. FIG. 14 is a side view illustrating the prestress locking member according to the first exemplary embodiment.

Referring to FIGS. 13 and 14, each of the prestress locking members 70 is fixed to the inner wall of the housing 1200, and includes a casing 73, an insulator 75 installed in the casing 73, and a pressure rod 71 coupled to the insulator 75. Three prestress locking members 70 may be installed on one side of each collection module. Among the three prestress locking members 70, two may be disposed at the upper portion of the side and one may be disposed at the lower portion of the side.

The casing 73 is cylindrical and has an internal space, and a bracket 76 is installed to one side of the casing 73 to fix the casing 73 to the housing 1200. The casing 73 may be provided with an air inlet 731 and a purge air supply pipe 79 may be connected to the air inlet 731. The purge air introduced into the casing 73 prevents the occurrence of dielectric breakdown due to condensation of internal gas and inflow of moisture while the purge air is discharged downward.

The insulator 75 may include an upper insulator 75a fixed to the upper portion of the casing 73, a lower insulator 75b fixed to the lower portion of the casing 73, and an insulating tube 75c connecting the upper insulator 75a and the lower insulator 75b. The pressure rod 71 is fixed to the insulator 75 and protrudes downward of the prestress locking member 70.

The pressure rod 71 is coupled to an associated one of the discharge-electrode-side support beams 80, and the prestress locking member 70 is installed to press the discharge-electrode-side support beam 80 in a central direction. The discharge-electrode-side support beams 80 are disposed at the respective outermost sides of the stacked discharge electrodes 12 and extend in the width direction of the discharge electrodes 12. The plurality of discharge-electrode-side support beams 80 coupled to the second tie rods 17 may be installed on the side ends of the collection modules 100, and the above three prestress locking members 70 may be coupled to two of the discharge-electrode-side support beams 80.

Each of the discharge-electrode-side support beams 80 includes an upper support plate 81, a side support plate 82 bent and extending downward from the upper support plate 81, and a lower support plate 83 bent from the side support plate 82 to be disposed in parallel to the upper support plate 81. The second tie rods 17 may be coupled to the side support plate 82.

When the discharge-electrode-side support beam 80 is installed in the state in which it is pressed and insulated by the prestress locking member 70, it is possible to effectively reduce the vibration of the collection module 100. In addition, since the internal space of the housing 1200 is divided into a plurality of spaces by the internal partition wall 1260, dust collection can be performed together with washing.

Figure 15:
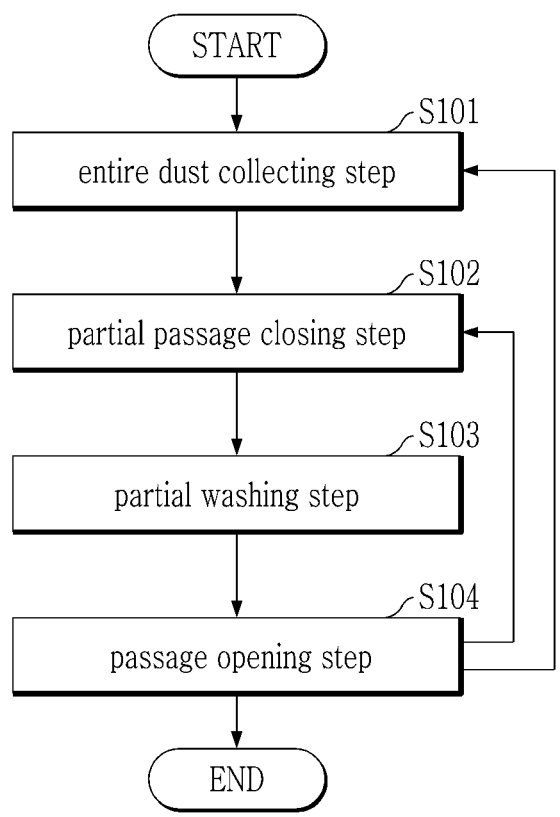
FIG. 15 is a flowchart illustrating an electrostatic precipitation method according to the first exemplary embodiment.

Hereinafter, an electrostatic precipitation method using the electrostatic precipitator according to the first exemplary embodiment will be described. FIG. 15 is a flowchart illustrating the electrostatic precipitation method according to the first exemplary embodiment.

Referring to FIG. 15, the electrostatic precipitation method according to the first exemplary embodiment may include an entire dust collecting step S101, a partial passage closing step S102, a partial washing step S103, and a passage opening step S104.

In the entire dust collecting step S101, in the state in which the passage switching members 1600 are rotated to open all the flow spaces FS, gas such as air or combustion gas flows into the flow spaces FS while a particular voltage is applied to the discharge electrodes 12 and the collection electrodes 13 are grounded to collect fine dust.

The inlet duct 1240 and the outlet duct 1250 are formed on the sides of the housing 1200, and the passage switching members 1600 are installed in the respective inlet and outlet ducts 1240 and 1250. In the entire dust collecting step S101, the gas may flow in a parallel direction to the ground. In the entire dust collecting step S101, the voltage may be applied to the discharge electrodes 12 through the lower frames 30 suspended from the insulating connection members 40.

The entire dust collecting step S101 may include a sensing step of measuring a degree/amount of dust attached on the collection electrodes 13 using the sensors 1900 during dust collection and a washing determination step of determining whether or not washing is to be performed based on the sensed information. When it is determined in the washing determination step that the washing is necessary, the partial passage closing step S102 may be performed. Thus, it is possible to perform the washing only on a necessary portion while continuously performing the dust collection on the other portion.

In addition, the partial washing may be performed at a pre-input cycle for a pre-input time. The washing cycle may be 1 to 48 hours and the washing time may be 30 to 300 seconds.

In the partial passage closing step S102, the passage switching members 1600 close some of the flow spaces FS divided by the internal partition wall 1260. In the partial passage closing step S102, the inlet-side and outlet-side passage switching members 1600 in one of the flow spaces FS are rotated to close the flow space FS. In the partial passage closing step S102, the voltage applied to the collection electrodes 13 positioned in the closed flow space FS is cut off. In the partial passage closing step S102, only one flow space FS may be closed. In this case, the flow spaces FS may be sequentially closed from one side end to the other side.

In the partial passage closing step S102, a plurality of flow spaces FS may be simultaneously closed. When the plurality of flow spaces FS are closed, a particular flow space FS, which is opened, and another flow space FS, which is closed, may be alternately positioned. That is, in the partial passage closing step S102, the flow spaces FS are closed in such a manner that an open flow space FS is positioned between closed flow spaces FS (in an alternating or staggered manner), thereby enabling the opening and closing of the flow spaces to be performed while minimally interrupting the flow of gas.

In the partial passage closing step S102, the process may be set such that the washing is performed on the outermost flow space FS with only one (first) flow space FS closed, an adjacent (second) flow space FS is skipped, the washing is performed on a third flow space FS and a fifth flow space FS, and then the washing is performed on a second flow space FS and a fourth flow space FS. That is, in the partial passage closing step S102, a flow space FS that is not adjacent to the washed flow space FS may be closed.

In the partial washing step S103, a voltage is applied to the discharge electrodes 12 in the open flow spaces FS to perform dust collection, and washing water is supplied to the collection electrodes 13 in the closed flow spaces FS to perform washing. The partial washing step S103 may include a washing water spraying step of spraying washing water to the collection modules 100, and a washing water collecting step of collecting the washing water sprayed for washing into the reservoir disposed beneath the collection modules 100. In the washing water spraying step, the washing water may be sprayed in a direction parallel to the ground using the nozzles installed on each opposing (both) side ends of the collection modules.

Since the washing is partially performed as described above, it is possible to remove the dust attached on the collection electrodes 13 by washing only a portion thereof without interruption of the overall dust collection operation. In the partial washing step S103, the washing water may flow into the reservoir installed on the bottom of the housing 1200.

In the passage opening step S104, after the passage switching members 1600 installed adjacent to the outlet are opened to discharge moisture, the passage switching members 1600 disposed adjacent to the inlet are opened to introduce gas into the flow spaces FS. Thus, since before the application of the voltage, the gas is introduced into the flow spaces FS to remove fine droplets, it is possible to minimize the occurrence of undesirable electrical arcs between the collection electrodes 13 and the discharge electrodes 12.

When the passage opening step S104 is completed, the partial passage closing step S102, the partial washing step S103, and the passage opening step S104 are repeated to wash the other flow spaces FS that were not washed. The process ends when the washing of all the flow spaces FS is completed.

Figure 16:
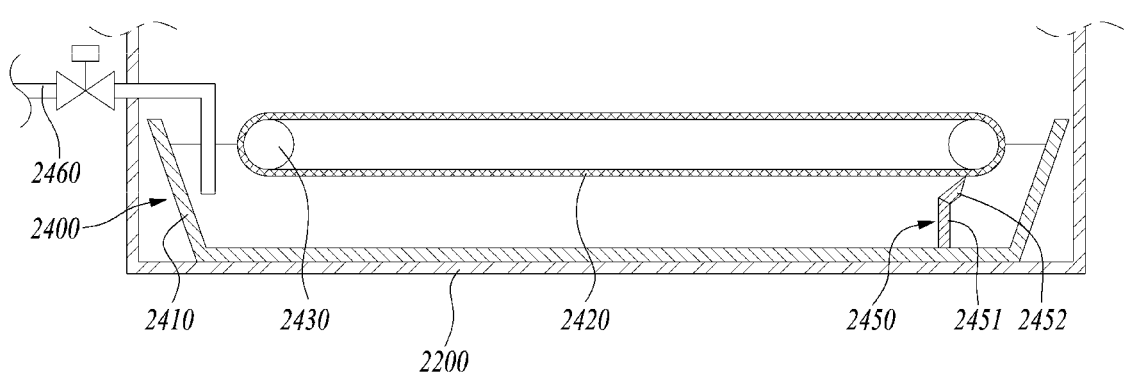
FIG. 16 is a cross-sectional view illustrating a washing water treatment device installed beneath collection modules according to a second exemplary embodiment.
Figure 17:
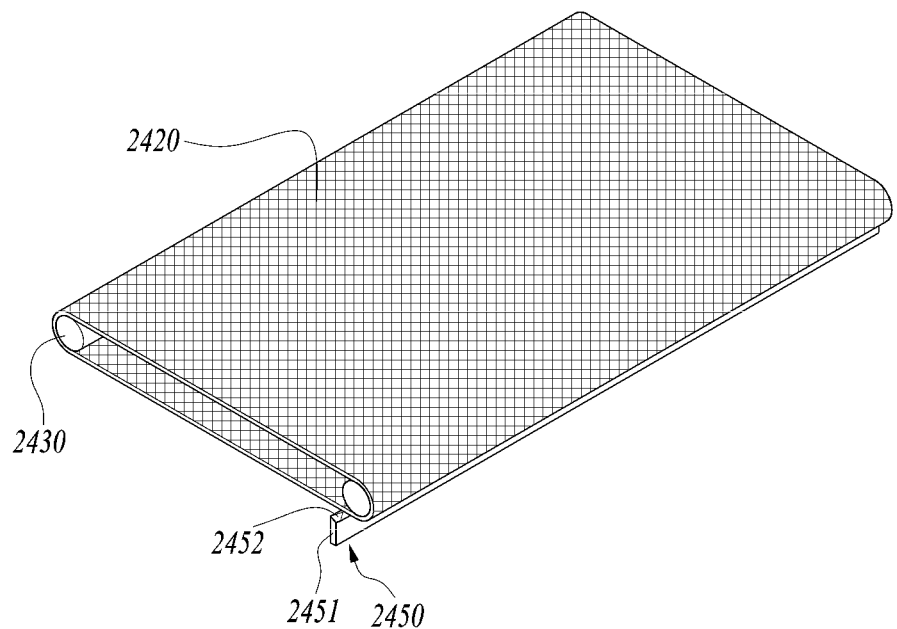
FIG. 17 is a perspective view partially illustrating the washing water treatment device according to the second exemplary embodiment.

Hereinafter, an electrostatic precipitator according to a second exemplary embodiment will be described. FIG. 16 is a cross-sectional view illustrating a washing water treatment device installed on the bottom of the electrostatic precipitator according to the second exemplary embodiment. FIG. 17 is a perspective view partially illustrating the washing water treatment device according to the second exemplary embodiment.

Referring to FIGS. 16 and 17, since the electrostatic precipitator according to the second exemplary embodiment has the same structure as the electrostatic precipitator according to the first exemplary embodiment, except for the washing water treatment device, a redundant description thereof will be omitted.

The electrostatic precipitator further includes the washing water treatment device which is designated by reference numeral 2400. The washing water treatment device 2400 is disposed on the bottom of a housing 2200 to accommodate washing water dropping from collection modules and solidify dust contained in the collected washing water. The washing water treatment device 2400 may include a reservoir 2410 configured to store washing water, a filter belt 2420 installed at the upper portion of the reservoir 2410, rollers 2430 configured to move the filter belt 2420, and a scraper 2450 configured to separate the dust attached on the filter belt 2420. Here, the washing water may be water or an aqueous sodium hydroxide solution. When the aqueous sodium hydroxide solution is used as the washing water, the washing capability of the washing water treatment device can be improved.

The reservoir 2410 is disposed on the bottom of the housing 2200 and stores the washing water supplied through a washing water feeder 2300 therein. The reservoir 2410 may be connected to a washing water replenishment line 2460 for replenishment of washing water, and the washing water replenishment line 2460 may have a valve installed therein.

The filter belt 2420 may be in a mesh form and be made of porous metal or synthetic resin. When the filter belt 2420 has a mesh-like structure, the dust contained in the washing water may be attached on the filter belt 2420 and the washing water may flow into the reservoir 2410 through the filter belt 2420.

The filter belt 2420 is in an endless-track form having its longitudinal ends connected to each other. The lower portion of the filter belt 2420 is submerged in the washing water and the upper portion of the filter belt 2420 is exposed from the washing water. That is, for the (annular) filter belt 2420 that is flat in its longitudinal section, its lower vertical center may be submerged in the washing water and its upper vertical center may be positioned above the washing water. The filter belt 2420 has a flat upper surface positioned above the washing water, a flat lower surface submerged in the washing water, and curved side surfaces connecting the upper surface and the lower surface.

During the operation of the filter belt 2420, the lower portion of the filter belt 2420 adsorbs and filters out the dust in the washing water and the upper portion thereof filters out the dust contained in the dropping washing water.

The two rollers 2430 support both longitudinal ends of the filter belt 2420. A motor for rotating the rollers 2430 is connected to the rollers 2430 to move the filter belt 2420. The rollers 2430 may be intermittently operated only when washing water is supplied.

The scraper 2450 abuts on the lower portion of the filter belt 2420 to scrape off the dust deposited on the filter belt 2420 to separate the dust therefrom. The scraper 2450 may include a support rod 2451 and a tip 2452 fixed on the support rod 2451. The support rod 2451 is installed vertically and fixedly on the bottom of the reservoir 2410. The tip 2452 may be inclined relative to the support rod 2451 while protruding upward and be made of an elastic material. The mass of dust separated by the scraper 2450 is solidified and accumulated on the bottom of the reservoir 2410 so that relatively clean washing water is present at the upper portion of the reservoir 2410. Such upper washing water may be supplied to the washing water feeder 2300 for use in further washing.

Figure 18:
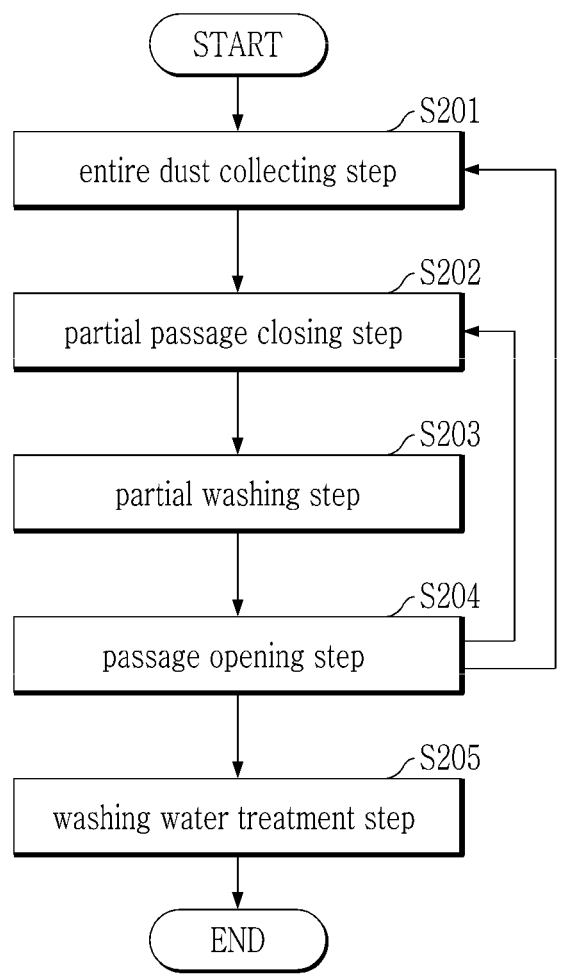
FIG. 18 is a flowchart illustrating an electrostatic precipitation method according to the second exemplary embodiment.

Hereinafter, an electrostatic precipitation method using the electrostatic precipitator according to the second exemplary embodiment will be described. FIG. 18 is a flowchart illustrating the electrostatic precipitation method according to the second exemplary embodiment.

Referring to FIG. 18, the electrostatic precipitation method according to the second exemplary embodiment may include an entire dust collecting step S201, a partial passage closing step S202, a partial washing step S203, a passage opening step S204, and a washing water treatment step S205.

Since the electrostatic precipitation method according to the second exemplary embodiment is the same as the electrostatic precipitation method according to the first exemplary embodiment, except for the washing water treatment step S205, a redundant description thereof will be omitted.

In the partial washing step S203, a voltage is applied to the discharge electrodes in the open flow spaces to perform dust collection, and washing water is supplied to the collection electrodes in the closed flow spaces to perform washing. The partial washing step S203 may include a washing water spraying step of spraying washing water to the collection modules, and a washing water collecting step of collecting the washing water sprayed for washing into the reservoir disposed beneath the collection modules.

The washing water treatment step S205 is performed simultaneously with the partial washing step S203 or after the partial washing step S203, to remove foreign substances from the washing water dropping from the collection modules.

In the washing water treatment step S205, foreign substances are removed from the washing water stored in the reservoir 2410. In the washing water treatment step S205, the foreign substances are adsorbed onto and filtered out by the endless-track-shaped filter belt 2420 as it moves. In the washing water treatment step S205, the dust attached on the mesh-shaped filter belt 2420 is scraped off by the scraper 2450 and separated from the filter belt 2420, and the solidified foreign substances are accumulated on the bottom of the reservoir 2410.

In the washing water treatment step S205, when the filter belt 2420 is operated using the rollers 2430 in the state in which a portion of the filter belt 2420 is submerged in the washing water and the other portion of the filter belt 2420 is positioned above the washing water, the upper portion of the filter belt 2420 collects dust and the collected dust is separated from the lower portion of the filter belt 2420 that is moved. In the washing water treatment step S205, the elastic tip 2452 is in contact with the filter belt 2420 to separate foreign substances from the filter belt 2420. Thus, according to the second exemplary embodiment, the washing water stored in the reservoir 2410 can be used for a predetermined period without being discharged. In addition, when the washing water needs to be replaced, a worker can remove the mass of foreign substances, dust, etc. from the bottom of the reservoir 2410 and replace the washing water.

As described above, according to the second exemplary embodiment, since the mass of dust sinks to the bottom of the reservoir 2410, it is possible to purify the washing water and thus increase the service life of the washing water.

Figure 19:
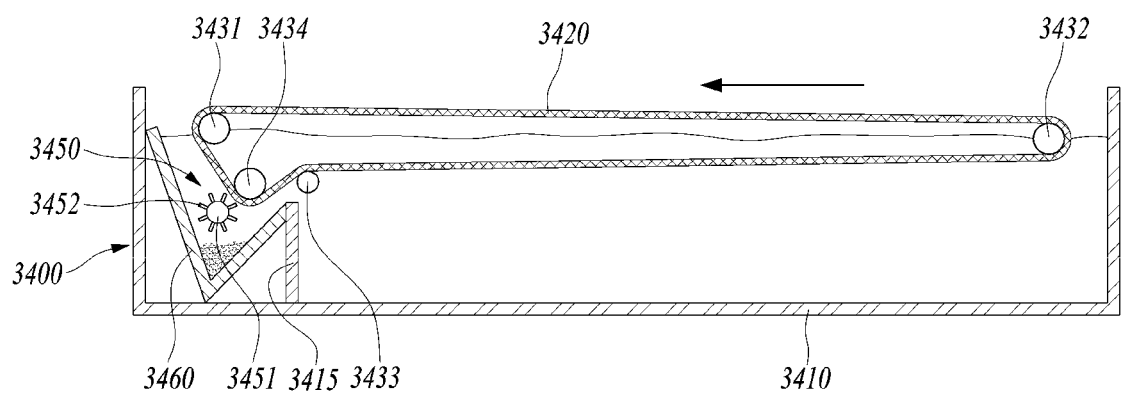
FIG. 19 is a cross-sectional view illustrating a washing water treatment device according to a third exemplary embodiment.

Hereinafter, an electrostatic precipitator according to a third exemplary embodiment will be described. FIG. 19 is a cross-sectional view illustrating a washing water treatment device according to the third exemplary embodiment.

Referring to FIG. 19, since the electrostatic precipitator according to the third exemplary embodiment has the same structure as the electrostatic precipitator according to the first exemplary embodiment, except for the washing water treatment device, a redundant description thereof will be omitted.

The washing water treatment device, which is designated by reference numeral 3400, is disposed at the lower portion of the housing. The washing water treatment device 3400 accommodates the washing water dropping from collection modules 300 and solidifies the dust removed from the washing water. The washing water treatment device 3400 may include a reservoir 3410 configured to store washing water, a filter belt 3420 installed at the upper portion of the reservoir 3410, rollers configured to move the filter belt 3420, and a scraper 3450 configured to separate the dust attached on the filter belt 3420. Here, the washing water may be water or an aqueous sodium hydroxide solution. When the aqueous sodium hydroxide solution is used as the washing water, the washing capability of the washing water treatment device can be improved.

The reservoir 3410 is disposed on the bottom of the housing and stores the washing water supplied through a washing water feeder 3300 therein. The reservoir 3410 may be connected to a washing water replenishment line for replenishment of washing water, and the washing water replenishment line may have a valve installed therein.

The filter belt 3420 may be in a mesh form and be made of porous metal or synthetic resin. When the filter belt 3420 is in the mesh form, the dust contained in the washing water may be attached on the filter belt 3420 and the washing water may flow into the reservoir 3410 through the filter belt 3420.

That is, the filter belt 3420 may be formed of a metal or synthetic resin mesh as a net structure. On the other hand, the filter belt 3420 may be formed of a porous metal or synthetic resin plate. When the filter belt 3420 is in the mesh form, the dust contained in the washing water may be adsorbed onto and filtered out by the filter belt 3420 and the washing water may flow into the reservoir 3410 through the filter belt 3420.

The filter belt 3420 is in an endless-track form with its longitudinal ends connected to each other. The lower portion of the filter belt 3420 is submerged in the washing water and the upper portion of the filter belt 3420 is exposed from the washing water. During the operation of the filter belt 3420, the lower portion of the filter belt 3420 adsorbs and filters out the dust in the washing water and the upper portion thereof filters out the dust contained in the dropping washing water. The dust may be filtered out by the exposed portion of the filter belt 3420 and moved to the scraper 3450.

The rollers are installed to the filter belt 3420 to support and move the filter belt 3420. The rollers include two support rollers 3431 and 3432 positioned at both longitudinal ends of the filter belt, and first and second diversion rollers 3433 and 3434 disposed between the support rollers 3431 and 3432 to support the lower portion of the filter belt 3420 to protrude downward. The support rollers 3431 and 3432 abut on the inward surface of the filter belt 3420, the first diversion roller 3433 abuts on the outer surface of the filter belt 3420, and the second diversion roller 3434 abuts on the outward surface of the filter belt 3420.

The first diversion roller 3433 supports the lower end of the filter belt 3420 to move upward so that the lower end of the filter belt 3420 is inclined relative to the ground. The vertical distance between the upper and lower portions of the filter belts 3420 decreases from one support roller 3432 to the first diversion roller 3433. The second diversion roller 3434 is disposed between the first diversion roller 3433 and the support roller 3431 to support the lower end of the filter belt 3420 to be inclined upward.

The second diversion roller 3434 allows the lower end of the filter belt 3420 to be positioned beneath the upper end of a blocking wall 3415 so that the filter belt 3420 is partially inserted into the space in which the scraper 3450 is located. That is, the first diversion roller 3433 supports the filter belt 3420 to move above the upper end of the blocking wall 3415, thereby preventing the filter belt 3420 from interfering with the blocking wall 3415. The second diversion roller 3434 allows the lower end of the filter belt 3420 to be positioned beneath the blocking wall 3415, thereby preventing a mass of dust from crossing the blocking wall 3415. The scraper 3450 abuts on the filter belt 3420 between the second diversion roller 3434 and the support roller 3431.

The blocking wall 3415 is installed in the reservoir 3410 and separates the space, in which the scraper 3450 is located, from a remaining space. The blocking wall 3415 may be positioned between the first diversion roller 3433 and the second diversion roller 3434, but the present disclosure is not limited thereto. However, the blocking wall 3415 may be disposed adjacent to the scraper 3450. The first diversion roller 3433 may be positioned above the blocking wall 3415.

The scraper 3450 is installed in the reservoir and abuts on the lower portion of the filter belt 3420 to scrape off the dust attached on the filter belt 3420 to separate the dust from the filter belt 3420. The scraper 3450 includes a rotary rod 3451 and a plurality of brushes 3452 protruding from the outer peripheral surface of the rotary rod 3451. The brushes 3452 may extend in the longitudinal direction of the rotary rod 3451 and be spaced apart from each other in the circumferential direction of the rotary rod 3451. The brushes 3452 may each be made of an elastic material and abut on the filter belt 3420 to scrape off dust. A motor may be connected to the rotary rod 3451 to rotate the rotary rod 3451.

The mass of dust separated by the scraper 3450 is solidified and accumulated on the bottom of the reservoir 3410 so that relatively clean washing water is present at the upper portion of the reservoir 3410. Since the mass of dust is placed in the space separated by the blocking wall 3415, the washing water in the remaining space can be purified.

Meanwhile, a separation container 3460 may be installed beneath the scraper 3450 to accommodate a mass of dust. The separation container 3460 may be positioned in the space separated by the blocking wall 3415 and have a triangular longitudinal section. Thus, the mass of dust in the separation container 3460 cannot be easily separated from the separation container, and workers can easily manage the washing water by periodically replacing the separation container.

Figure 20:
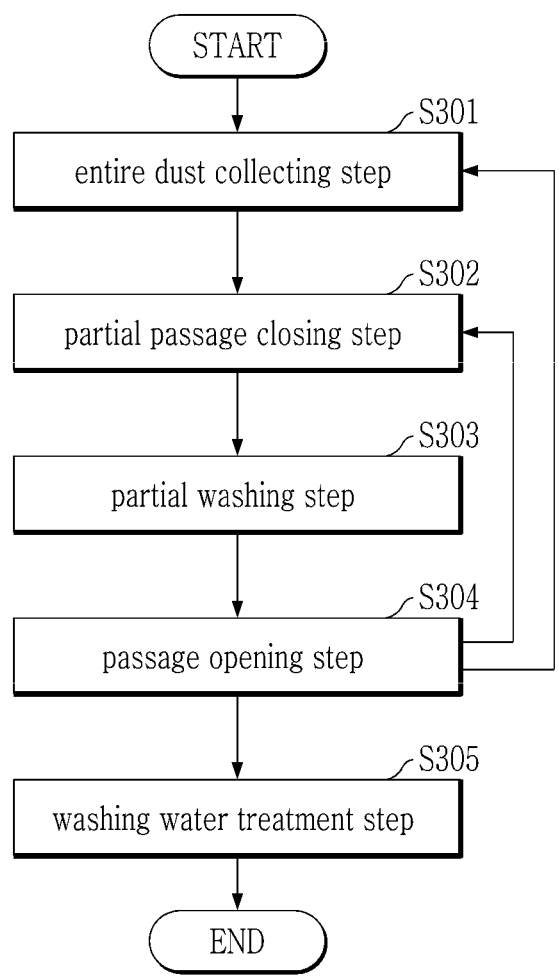
FIG. 20 is a flowchart illustrating an electrostatic precipitation method according to the third exemplary embodiment.

Hereinafter, an electrostatic precipitation method using the electrostatic precipitator according to the third exemplary embodiment will be described. FIG. 20 is a flowchart illustrating the electrostatic precipitation method according to the third exemplary embodiment.

Referring to FIG. 20, the electrostatic precipitation method according to the third exemplary embodiment may include an entire dust collecting step S301, a partial passage closing step S302, a partial washing step S303, a passage opening step S304, and a washing water treatment step S305.

Since the electrostatic precipitation method according to the third exemplary embodiment is the same as the electrostatic precipitation method according to the first exemplary embodiment, except for the washing water treatment step S305, a redundant description thereof will be omitted.

The washing water treatment step S305 is performed simultaneously with the partial washing step S303 or after the partial washing step S303, to remove foreign substances from the washing water dropping from the collection modules.

In the washing water treatment step S305, washing water is accommodated in the reservoir 3410 disposed beneath the collection modules, and foreign substances are attached on the endless-track-shaped filter belt 3420 while the filter belt 3420 moves. In addition, in the washing water treatment step S305, the dust attached on the mesh-shaped filter belt 3420 is scraped off by the scraper 3450 and separated from the filter belt 3420, and the solidified foreign substances are accumulated on the bottom of the reservoir 3410.

In the washing water treatment step S305, when the filter belt 3420 is operated using the rollers in the state in which a portion of the filter belt 3420 is submerged in the washing water and the other portion of the filter belt 3420 is positioned above the washing water, the upper portion of the filter belt 3420 collects dust and the collected dust is separated from the lower portion of the filter belt 3420 that is moved. In the washing water treatment step S305, foreign substances are separated from the filter belt 3420 by the scraper 3450 which includes the rotary rod 3451 and the brushes 3452 protruding from the outer peripheral surface of the rotary rod 3451 and spaced apart from each other in the circumferential direction of the rotary rod 3451. In the washing water treatment step S305, the scraper 3450 may separate dust from the filter belt 3420 while rotating in the state in which the scraper 3450 abuts on the filter belt 3420.

The blocking wall 3415 may be installed in the reservoir 3410 to separate the space, in which the scraper 3450 is located, from the remaining space. The separation container 3460 may be installed in the space separated by the blocking wall 3415. In the washing water treatment step S305, the filter belt 3420 may be supported by the two support rollers 3431 and 3432 positioned at both longitudinal ends thereof, and protrude downward by the diversion rollers 3433 and 3434 to be partially inserted into the space in which the scraper 3450 is present. Thus, the foreign substances separated from the filter belt 3420 in the washing water treatment step S305 may be accommodated in the separation container 3460.

According to the third exemplary embodiment, the washing water stored in the reservoir 3410 can be used for a certain period without being discharged. In addition, when the washing water needs to be replaced, workers can remove the mass of dust from the bottom of the reservoir 3410 and replace the washing water.

As is apparent from the above description, the electrostatic precipitator according to the exemplary embodiments includes therein the plurality of partition walls arranged in the flow direction of gas and the passage switching member installed in each of the spaces defined by the partition walls, thereby performing dust collection on some of the spaces while performing washing on the others.

While the specific embodiments have been described with reference to the drawings, the disclosure is not limited thereto. It will be apparent to those skilled in the art that various changes and modifications may be made without departing from the concepts and scope of the disclosure as defined in the following claims.

What is claimed is:

1. A horizontal electrostatic precipitator comprising:
   a housing having an inlet duct, into which a gas is introduced, and an outlet duct from which the gas is discharged;
   an internal partition wall extending in a direction of flow of the gas in the housing and configured to respectively divide spaces within the housing;
   a plurality of passage switching members in the respectively divided spaces to control the flow of the gas;
   a collection module in the housing and comprising a plurality of discharge electrodes, to which a voltage is applied, and a plurality of collection electrodes disposed between the respective discharge electrodes, the plurality of collection electrodes being grounded, and the collection module being configured to collect dust; and
   a washing water feeder configured to spray washing water to the collection module and to selectively spray the washing water to some of the respectively divided spaces.

2. The horizontal electrostatic precipitator according to claim 1, wherein the inlet and outlet ducts are on respective sides of the housing, and the plurality of passage switching members are in the inlet and outlet ducts, respectively while being rotatable relative to the housing.

3. The horizontal electrostatic precipitator according to claim 1, further comprising a controller configured to control the washing water feeder to supply the washing water only to one of the respectively divided spaces, which is closed so that inflow and outflow of air are blocked by controlling the passage switching members.

4. The horizontal electrostatic precipitator according to claim 1, further comprising a washing water treatment device beneath the collection module to accommodate the washing water dropping from the collection module, wherein the washing water treatment device comprises:
   a reservoir configured to accommodate the washing water;
   an adsorption belt in an endless-track form;
   a roller operatively connected to the adsorption belt to move the adsorption belt; and
   a scraper configured to scrape off foreign substances attached on the adsorption belt.

5. The horizontal electrostatic precipitator according to claim 4, wherein the adsorption belt has a mesh-like structure.

6. The horizontal electrostatic precipitator according to claim 5, wherein a portion of the adsorption belt is submerged in the washing water and the other portion of the adsorption belt is above the washing water.

7. The horizontal electrostatic precipitator according to claim 5, wherein the scraper comprises a support rod installed vertically on the bottom of the reservoir and an elastic tip protruding upward from the support rod.

8. The horizontal electrostatic precipitator according to claim 4, wherein the scraper comprises a rotary rod and a plurality of paddles protruding from an outer peripheral surface of the rotary rod, the paddles being spaced apart from each other in a circumferential direction of the rotary rod.

9. The horizontal electrostatic precipitator according to claim 4, wherein:
   the washing water treatment device comprises two support rollers and first and second diversion rollers disposed between the support rollers, the first diversion roller being configured to support a lower end of the adsorption belt to move upward, the second division roller being configured to support the lower end of the adsorption belt to move downward; and a blocking wall is installed in the reservoir to separate a space, in which the scraper is located, from a remaining space.

10. The horizontal electrostatic precipitator according to claim 9, wherein the first diversion roller supports the adsorption belt to be positioned above an upper end of the blocking wall, and the second diversion roller supports the adsorption belt to be positioned beneath the upper end of the blocking wall.

11. The horizontal electrostatic precipitator according to claim 10, wherein the scraper is installed to abut on the adsorption belt between the second diversion roller and an associated one of the support rollers.

12. The horizontal electrostatic precipitator according to claim 11, wherein a separation container is installed beneath the scraper and positioned in the space separated by the blocking wall.

* * * * *